US007260207B2

(12) United States Patent
Marsico (10) Patent No.: US 7,260,207 B2
(45) Date of Patent: Aug. 21, 2007

(54) METHODS, SYSTEMS, AND COMPUTER PROGRAM PRODUCTS FOR PROVIDING PRESENCE-QUALIFIED E.164 NUMBER MAPPING (ENUM) SERVICE IN A COMMUNICATIONS NETWORK

(75) Inventor: Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 0 days.

(21) Appl. No.: 11/132,402

(22) Filed: May 18, 2005

(65) Prior Publication Data

US 2006/0262917 A1 Nov. 23, 2006

Related U.S. Application Data

(60) Provisional application No. 60/671,869, filed on Apr. 15, 2005.

(51) Int. Cl.
*H04M 7/00* (2006.01)

(52) U.S. Cl. .................. 379/220.01; 370/352; 370/353; 370/354; 370/355

(58) Field of Classification Search ........... 379/220.01; 370/352, 353, 354, 355
See application file for complete search history.

(56) References Cited

U.S. PATENT DOCUMENTS

| | | | |
|---|---|---|---|
| 6,539,077 B1 | 3/2003 | Ranalli et al. | |
| 6,748,057 B2 | 6/2004 | Ranalli et al. | |
| 6,839,421 B2 | 1/2005 | Ferraro Esparza et al. | |
| 6,871,070 B2 | 3/2005 | Ejzak | |
| 7,027,582 B2* | 4/2006 | Khello et al. | 379/220.01 |
| 2003/0007482 A1 | 1/2003 | Khello et al. | |
| 2004/0003114 A1 | 1/2004 | Adamczyk | |
| 2005/0027867 A1* | 2/2005 | Mueller et al. | 709/227 |
| 2006/0095524 A1* | 5/2006 | Kay et al. | 709/206 |

OTHER PUBLICATIONS

International Telecommunication Union, Telecommunication Standardization Union, Study Group 2, "Global Implementation of ENUM: A Tutorial Paper," (Feb. 8, 2002).
Peterson, J., Network Working Group, "Telephone Number Mapping (ENUM) Service Registration for Presence Services," (Jan. 2005).
Mealling, M., Network Working Group, "The Naming Authority Pointer (NAPTR) DNS Resource Record," (Sep. 2000).
Schwarz, Reuben, "ENUM Trial to Link Phone, Internet Addresses," (Mar. 22, 2005).
Peterson et al., "Using E.164 Numbers With the Session Initiation Protocol (SIP)," Network Working Group, pp. 1-14 (Jun. 2004).

* cited by examiner

*Primary Examiner*—Quynh H. Nguyen
(74) *Attorney, Agent, or Firm*—Jenkins, Wilson, Taylor & Hunt, P.A.

(57) ABSTRACT

Methods, systems, and computer program products for providing presence-qualified E.164 number mapping (ENUM) service in a communications network. According to one method, a query message including an E.164 number can be received. Next, at least one uniform resource identifier (URI) associated with the E.164 number can be located. A presence server can be queried for presence status information for the URI. Further, the query message can be responded to with the URI and a corresponding presence status.

54 Claims, 7 Drawing Sheets

METHODS, SYSTEMS, AND COMPUTER PROGRAM PRODUCTS FOR PROVIDING PRESENCE-QUALIFIED E.164 NUMBER MAPPING (ENUM) SERVICE IN A COMMUNICATIONS NETWORK

CROSS-REFERENCE TO RELATED APPLICATION

This application claims the benefit of U.S. Provisional Application No. 60/671,869 entitled "Systems and Methods for Providing Presence Qualified ENUM Service in a Communications Network", and filed Apr. 15, 2005, the disclosure of which is incorporated by reference herein in its entirety.

TECHNICAL FIELD

The subject matter described herein relates to providing E.164 number mapping (ENUM) service in a communications network. More particularly, the subject matter described herein relates to methods, systems, and computer program products for providing presence-qualified ENUM service in a communications network.

BACKGROUND ART

The Internet Engineering Task Force (IETF) initiated the development of the E.164 Number Mapping (ENUM) system for facilitating the interconnection of communications networks that rely on telephone numbers with the communications networks that utilize the Domain Name System (DNS). In particular, the ENUM system can map a particular number referred to as an E.164 number to one or more Uniform Resource Identifiers (URIs) in the DNS. URIs are strings of characters that identify resources such as documents, images, files, databases, e-mail addresses, websites or other resources or services in a common structured format. A URI can include a SIP URI, an instant messaging (IM) identifier, an e-mail address identifier, an Internet chat session identifier, and an IP address.

Figure 1:
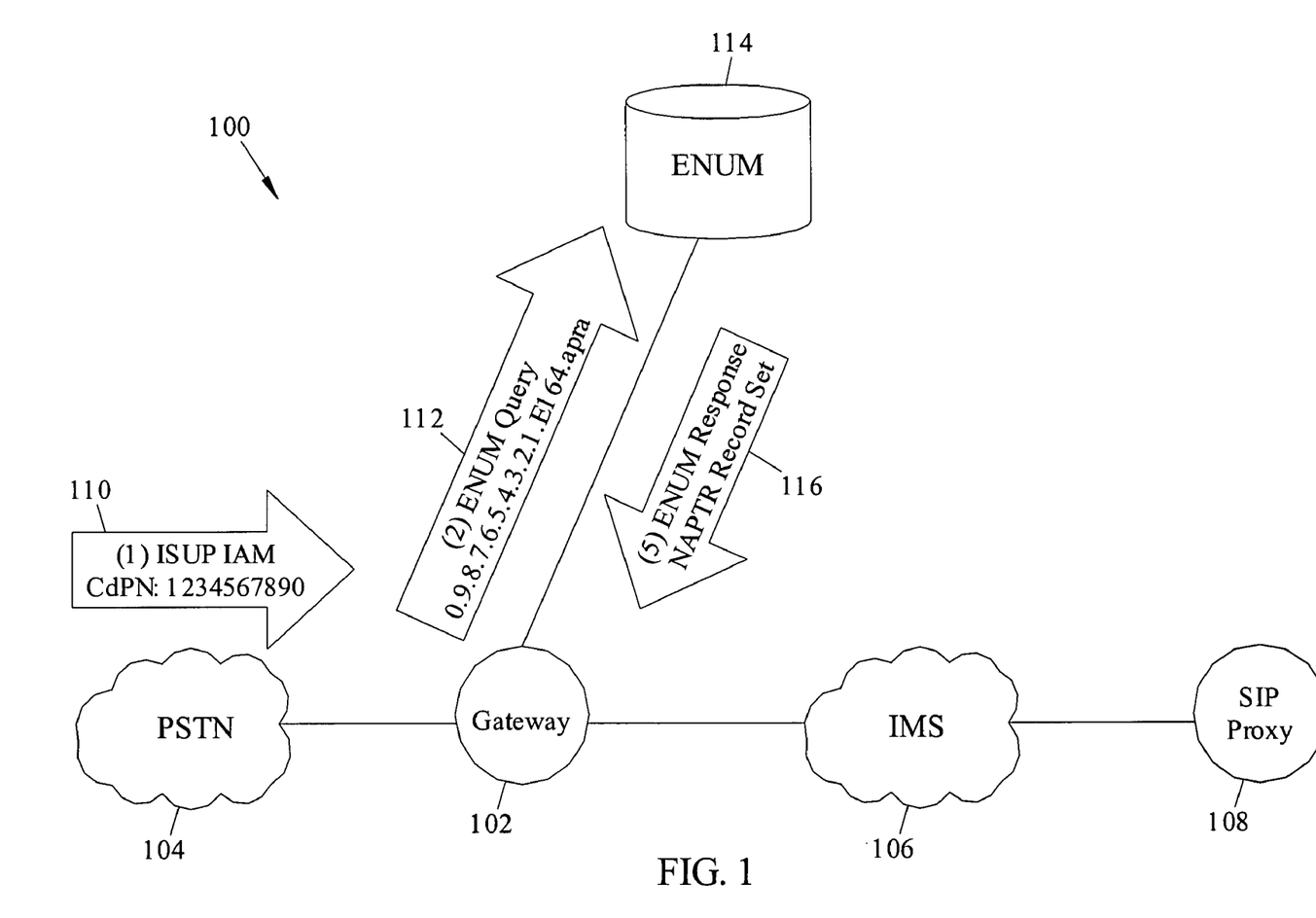
FIG. 1 is an exemplary communications network utilizing the ENUM system.

FIG. 1 is an exemplary communications network, generally designated 100, utilizing the ENUM system. Network 100 includes a gateway 102 for connecting the Public Switched Telephone Network (PSTN) system 104 to an IP Multimedia Subsystem (IMS) 106. Gateway 102 is operable to enable communication between a conventional telephone unit or other suitable network device connected to PSTN 104 and a mobile telephone unit or other suitable network device connected to IMS 106. The mobile telephone unit can communicate to IMS 106 via session initiation protocol (SIP) proxy server 108. The conventional telephone unit and mobile telephone unit can communicate voice data, text data, or other suitable data. ENUM system can be utilized, for example, when a user of the standard telephone unit attempts to reach a subscriber associated with the mobile telephone unit.

Communication between the conventional telephone unit and the mobile telephone unit can be initiated when a user of the conventional telephone unit dials a called party number (referred to herein as an E.164 number) for reaching a subscriber associated with the mobile telephone unit. A message containing the dialed E.164 number (or called party number) is routed to PSTN 104. PSTN 104 can then generate an ISUP AIM message 110 containing the E.164 number to gateway 102 which can determine whether the E.164 number is associated with the subscriber. Gateway 102 can determine whether the E.164 is associated with the subscriber by performing a look up in a subscriber database. In response to determining that the telephone number is associated with the subscriber, the E.164 number is converted into ENUM message format for transmission in an ENUM query 112. The E.164 number is converted to ENUM message format by reversing the digit order of the dialed E.164 number and appending the highest level domain e164.arpa to the end. For example, if the original E.164 number is 123-456-7890, ENUM query 112 is converted 0.9.8.7.6.5.4.3.2.1.e164.arpa (also referred to herein as an E.164 number). Next, the ENUM query is then communicated to an ENUM server 114. ENUM server 114 uses the ENUM query to retrieve one or more naming authority pointer (NAPTR) records associated with the E.164 number. Each of the NAPTR records may identify at least one URI corresponding to the subscriber with the E.164 number. The URI may identify the mobile telephone unit. The URI is then communicated to gateway 102 in an ENUM response 116 for establishing communication between the conventional telephone unit and the mobile telephone unit.

In addition, more than one URI can be contained in the NAPTR records for identifying one or more other network devices, services and/or addresses. For example, another URI returned to gateway 102 can identify a different way of reaching the subscriber associated with the dialed E.164 number, such as via e-mail or paging.

Rather than simply returning the URI or set of URIs obtained from ENUM server 114 to gateway 102, it may be desirable to obtain additional information, such as presence information for contacting the called party. Presence is a service that provides for the monitoring of the availability and disposition of services and/or addresses identified by URIs. Presence information is highly dynamic and generally characterize whether a user is online or offline, busy or idle, away from communications devices or nearby, and the like. Presence information is typically stored in a presence database. In order to obtain presence information regarding a subscriber, referred to as a presently, a subscribing entity must send a subscribe message to a presence server if presence information for the subscribed-to presently is available in the presence database, the presence server will respond with presence information for the presently. If presence information regarding the presently changes, the presence server will send presence update messages to subscribing entities.

As described above, the mechanisms for obtaining ENUM and presence information are distinct. However, it may be desirable to combine presence information with ENUM information to obtain enhanced contact information for a subscriber with multiple ENUM identities. Currently, such a combined mechanism does not exist. That is, a subscriber wishing to obtain presence information for multiple ENUM identities would be required to manually subscribe to or query a presence server for each ENUM identity.

Accordingly, in light of these difficulties associated with conventional ENUM systems, there exists a need for improved methods, systems, and computer program products for providing a combination of ENUM and presence services in a communications network.

SUMMARY

According to one aspect, the subject matter described herein comprises methods, systems, and computer program products for providing presence-qualified E.164 number mapping (ENUM) service in a communications network. One method includes receiving a query message including an E.164 number. Next, at least one uniform resource identifier (URI) associated with the E.164 number can be located. A presence server can be queried for presence status information for each URI. As used herein, the term "presence status information" refers to information indicating whether the subscriber is available or unavailable at the corresponding URI. Further, the query message can be responded to with each URI that has an available presence status.

Another method according to the subject matter described herein includes communicating a presence subscription request associated with a URI to a presence server. The method can also include receiving presence status information updates associated with the URI from the presence server. Further, the method can include storing the presence status information. The method can also include using the stored status information to respond with URIs associated with the E.164 number that have an available presence status in response to receiving an ENUM query including an E.164 number.

The subject matter described herein providing presence qualified ENUM mapping may be implemented using a computer program product comprising computer executable instructions embodied in a computer readable medium. Exemplary computer readable media suitable for implementing the subject matter described herein includes disk memory devices, programmable logic devices, application specific integrated circuits, and downloadable electrical signals. In addition, a computer readable medium that implements the subject matter described herein may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION

Figure 2:
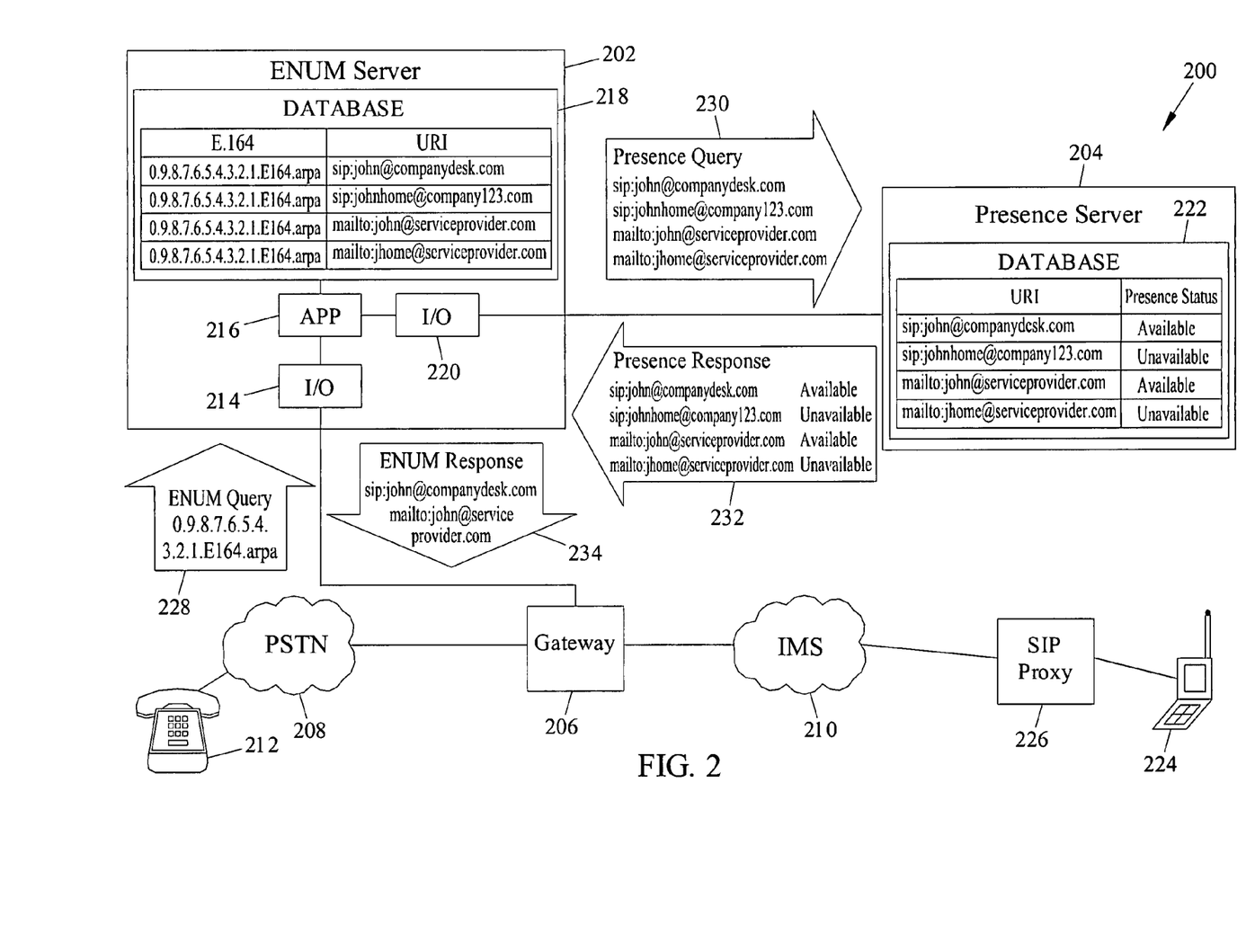
FIG. 2 is an exemplary system for providing presence-qualified ENUM service in a communications network according to an embodiment of the subject matter described herein.

FIG. 2 illustrates an exemplary system for providing presence-qualified ENUM service in a communications network, generally designated 200, according to an embodiment of the subject matter described herein. Referring to FIG. 2, the system can include an ENUM server 202 and a presence server 204 in operable communication with one another and with network 200. Network 200 can include a gateway 206 for providing communication between a PSTN 208 and an IMS 210. Further, gateway 206 can receive signaling messages for establishing communication between an end device in communication with PSTN 208 and IMS 210. For example, gateway 206 can receive message from PSTN 208 for establishing communication between a telephone unit 212 connected to PSTN 208 and a subscriber identified in the message by an E.164 number. Alternatively, gateway 206 can receive messages from any suitable source for establishing communication with a subscriber identified by an E.164 number.

Gateway 206 may determine whether an ENUM query is required based on whether the called party number corresponds to a subscriber of IMS network 210. If gateway 206 determines that an ENUM query is required, gateway 206 can transmit an ENUM query to ENUM server 202. ENUM server 202 can include an input/output (I/O) module 214 for receiving the ENUM query from gateway 206. The ENUM query may contain E.164 number. The E.164 number may be a called party telephone number. ENUM server 102 may also include an ENUM application 216 for performing a look up in an ENUM database 218 for retrieving one or more URIs associated with the received E.164 number. For example, ENUM database 218 can maintain naming authority pointer (NAPTR) records associated with the URIs. The URIs are associated with the subscriber identified by the E.164 number.

Next, ENUM server 202 can utilize another I/O module 220 for communicating a query message containing the retrieved one or more URIs to presence server 204. The query message can be a request for presence status information for one or more of the URIs. Presence server 204 can maintain a database 222 containing presence status information for the URIs. In response to receiving the query message from ENUM server 202, presence server 204 can perform a look up in database 222 to retrieve presence status information of each of the URIs. The retrieved presence status information for each URI can indicate the availability or unavailability associated with the URI. Presence server 204 can transmit to ENUM server 202 a response message containing the presence status information for one or more of the URIs. Based on the presence status information, ENUM server 202 can generate a response message containing availability and/or unavailability information for one or more URIs associated with the E.164 called party telephone number of the ENUM query. The response message can be communicated to gateway 206.

In one embodiment, ENUM server 202 responds to the ENUM query with only those URIs that were designated as available by presence server 204. By transmitting a message identifying only the available URIs, the complexity of processes implemented by gateway 206 can be reduced to thereby improve the processing efficiency of gateway 206. Alternatively, ENUM server 202 can respond to the ENUM query with the availability information for all URIs, even those that are currently unavailable.

One of the URIs identified as available in the response to gateway 206 may identify a mobile telephone 224 connected to IMS 210 via a SIP proxy 226. Gateway 206 may utilize the URI for establishing communication between telephone unit 212 and mobile telephone 224. Alternatively, gateway 206 can communicate one or more URIs identified in the response message to telephone unit 212 for informing a user of the availability of the subscriber associated with the E.164 number.

Figure 3:
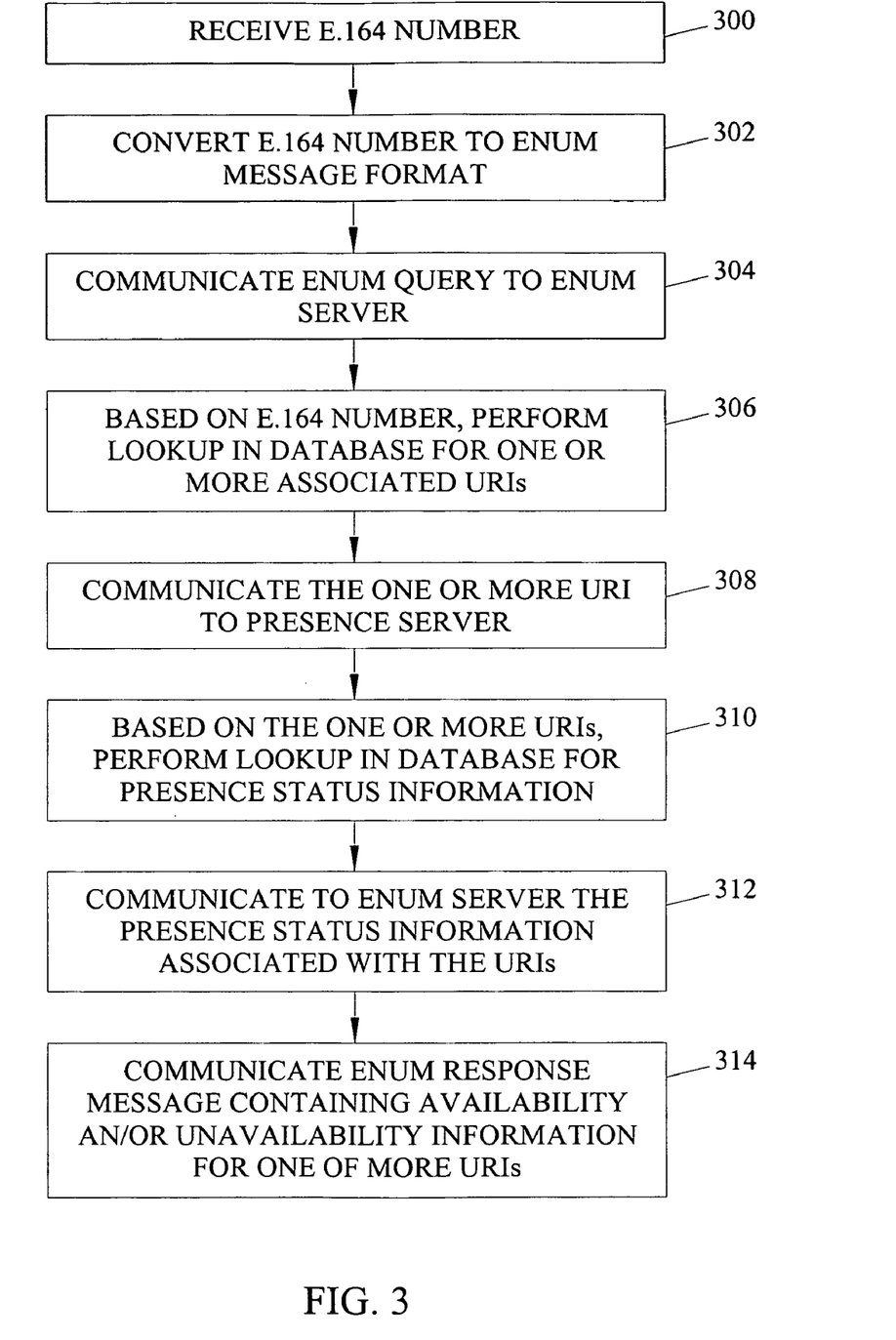
FIG. 3 is a flow chart illustrating exemplary steps for providing presence-qualified ENUM service in a communications network according to an embodiment of the subject matter described herein.

FIG. 3 is a flow chart illustrating exemplary steps for providing presence-qualified ENUM service in communications network 200 according to an embodiment of the subject matter described herein. Referring to FIG. 3, in step 300, a network device, such as gateway 206, can receive an E.164 number or called party number. Pursuant to IETF ENUM specifications, the network device can convert the E.164 number to an ENUM message format (step 302). For example, referring to FIG. 2, if the E.164 number is 123-456-7890, an ENUM query message 228 may read 0.9.8.7.6.5.4.3.2.1.E164.arpa. In this conversion example, the digit order of the telephone number is reversed, and the highest level domain E164.arpa is appended at the end. Next, at step 304, gateway 206 can communicate ENUM query message 228 to ENUM server 202 as described above. ENUM query 228 may be implemented utilizing a signaling protocol such as session initiation protocol (SIP).

At step 306 of FIG. 3, ENUM application 216 can utilize ENUM query message 228 for performing a look up in ENUM database 218 to retrieve one or more URIs associated with the received E.164 called party number. Exemplary URIs associated with E.164 number 0.9.8.7.6.5.4.3.2.1.E164.arpa include sip:john@companydesk.com, mailto:john@serviceprovider.com, sip:johnhome@company123.com, and mailto:jhome@serviceprovider.com.

Next, at step 308, ENUM server 202 can communicate a presence query message containing the one or more URIs to presence server 204. For example, referring to FIG. 2, a presence query message 230 can include the URIs associated with E.164 number 0.9.8.7.6.5.4.3.2.1.E164.arpa. Database 222 of presence server 204 can maintain data for indicating presence status information of the URIs in the query message. In the example shown in FIG. 2, the only URIs available are sip:john@companydesk.com and mailto:john@serviceprovider.com. In response to receiving a query message from ENUM server 202, presence server 204 can perform a look up in database 222 for retrieving presence status information of each of the URIs contained within the query message (step 310). The presence status information can be availability and/or unavailability information for one or more of the URIs associated with presence query message 230.

Next, at step 312 of FIG. 3, presence server 204 can communicate to ENUM server 202 a presence response message 232 containing the retrieved presence status information for one or more of the URIs. Based on received message 232, ENUM application 216 can generate an ENUM response message containing availability and/or unavailability information for one or more URIs associated with the E.164 number in the original ENUM message. For example, ENUM response message 234 indicates that the only URIs available are sip:john@companydesk.com and mailto:john@serviceprovider.com. At step 314, ENUM server 202 can communicate ENUM response message 234 to gateway 206.

According to one embodiment, the presence server or the ENUM server may be provided with information in addition to the E.164 number. For example, the presence server may be provided with calling party information such that the presence server may apply calling party "blacklist" or "whitelist" screening algorithms. These algorithms may be utilized for determining which URIs to return in response to an ENUM query. For example, callers identified in a calling party "blacklist" may be prevented from transmitting messages to the subscriber identified by the E.164 number. In contrast, callers identified in a calling party "whitelist" may be permitted to transmit messages to the subscriber identified by the E.164 number.

With respect to FIGS. 2 and 3, the ENUM and presence servers are described as separate devices. According to one embodiment, the functionality of the ENUM and presence servers may be combined into a single device. For example, the functionality of ENUM server 214, ENUM application 216, and database 222 may be combined into a single device operable to receive an ENUM query identifying an E.164 number of a subscriber, operable to respond to the ENUM query with one or more available URIs for the subscriber.

Figure 4:
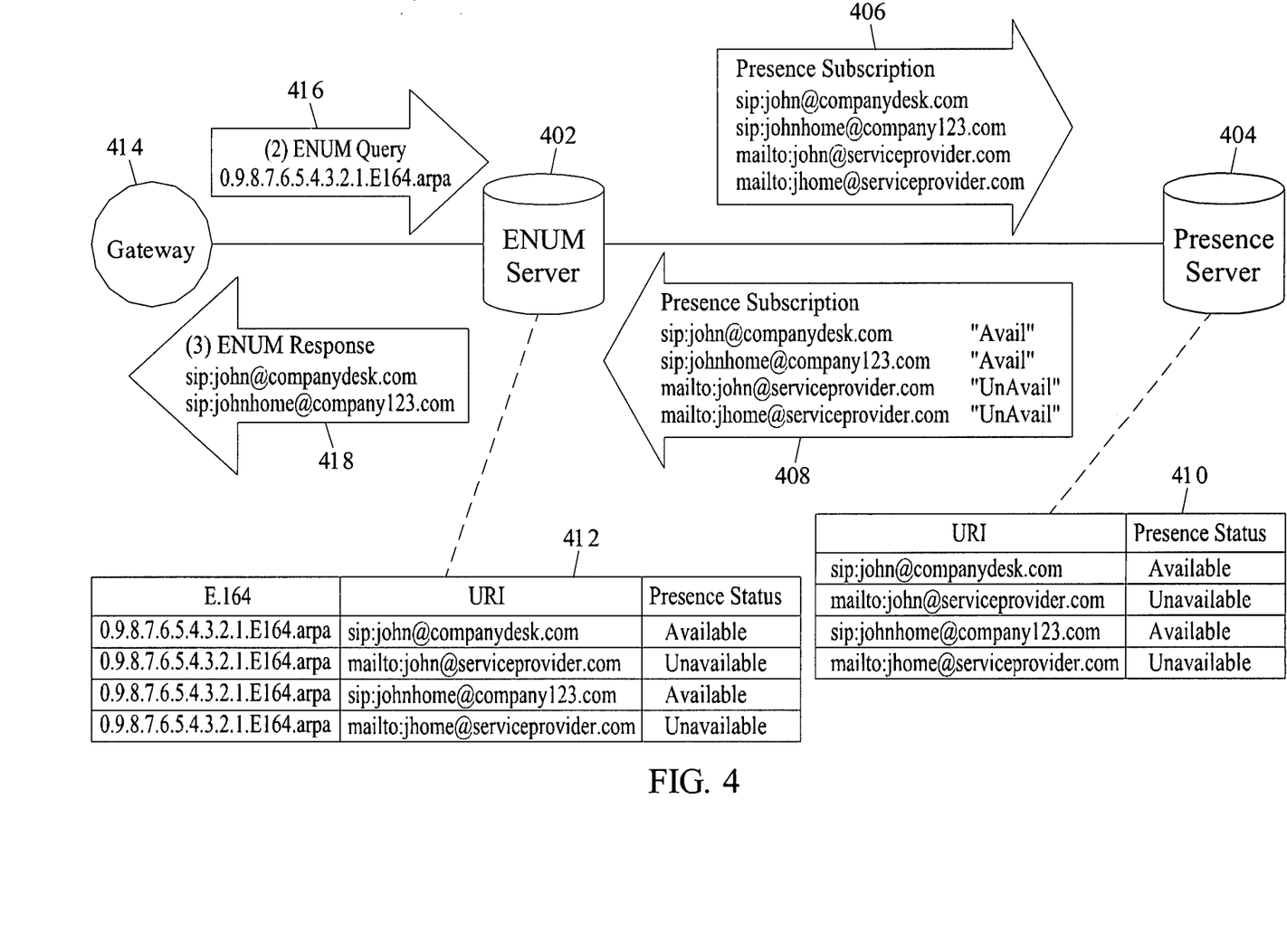
FIG. 4 is an exemplary system including a presence server operable to provide presence subscription service to an ENUM server according to an embodiment of the subject matter described herein.

According to another embodiment, a presence server may provide a presence subscription service to a network device such as ENUM server 202. In this embodiment, the presence server may report presence status changes of URIs. FIG. 4 illustrates an exemplary system including a presence server 400 operable to provide presence subscription service to an ENUM server 402 according to an embodiment of the subject matter described herein. Referring to FIG. 4, ENUM server 402 can transmit a presence subscription request message 406 to presence server 404. Presence subscription request message 406 can contain a request for presence status information for different URIs, such as all or a subset of URIs maintained in database 218. In the illustrated example, message 406 contains a request for status changes of the following URIs: sip:john@companydesk.com, mailto:john@serviceprovider.com, sip:johnhome@company123.com, and mailto:jhome@serviceprovider.com.

Presence server 404 can transmit a message indicating the availability status of each subscribed URI upon receiving a presence subscription request. Further, presence server 404 can generate and transmit a presence update message 408 when a change is made to the status of a URI for which a subscription has been established. For example, message 408 can contain an update on the availability information for each URI requested in message 406. The availability information can be contained in a database 410 accessible by presence server 404. ENUM server 402 can maintain a database 412 containing availability information for each subscribed URI. The updated availability information contained in message 408 can be used for updating database 412.

A gateway 414 can generate and transmit an ENUM query message 416 containing an E.164 number for requesting availability information associated with the E.164 number. In this example, the E.164 number is 0.9.8.7.6.5.4.3.2.1.E164.arpa. In response to receiving message 416, ENUM server 402 can search database 412 based on the E.164 number contained in message 416. Next, ENUM server 402 can retrieve the records having an available presence status and generate and transmit an ENUM response message 418 containing the URIs indicated as available. Alternatively, as described above, ENUM server 402 may respond with all of the URIs corresponding to the E.164 number and indicate the subscriber is available or whether unavailable at each URI. In this example of utilizing presence subscription service, it is not necessary to transmit a query message to presence server 404 for availability information because database 412 of ENUM server 402 is maintained with updated availability information.

Figure 5A:
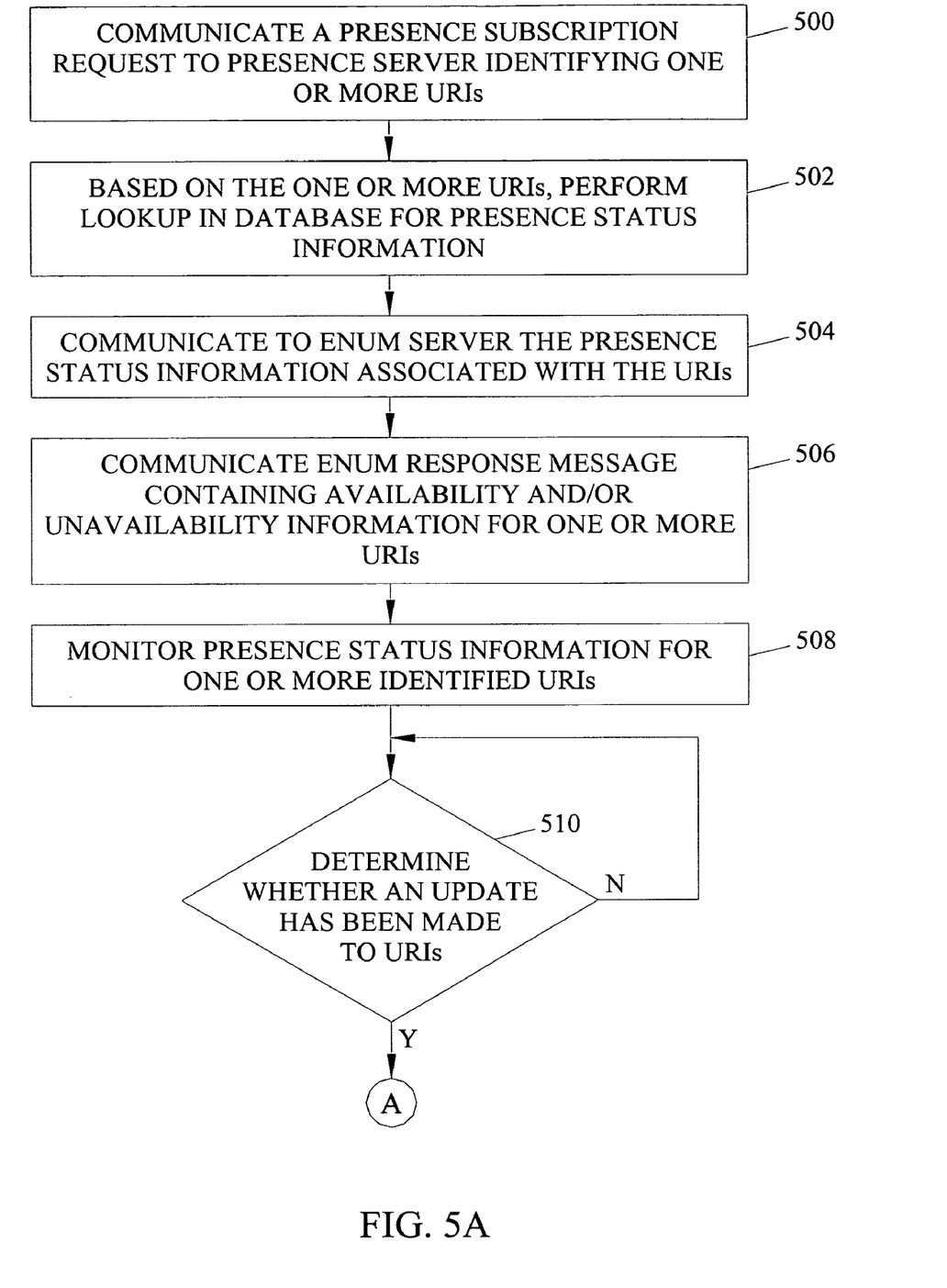
FIGS. 5A and 5B are a flow chart illustrating exemplary steps by which a presence server can provide presence subscription service to an ENUM server according to an embodiment of the subject matter described herein.
Figure 5B:
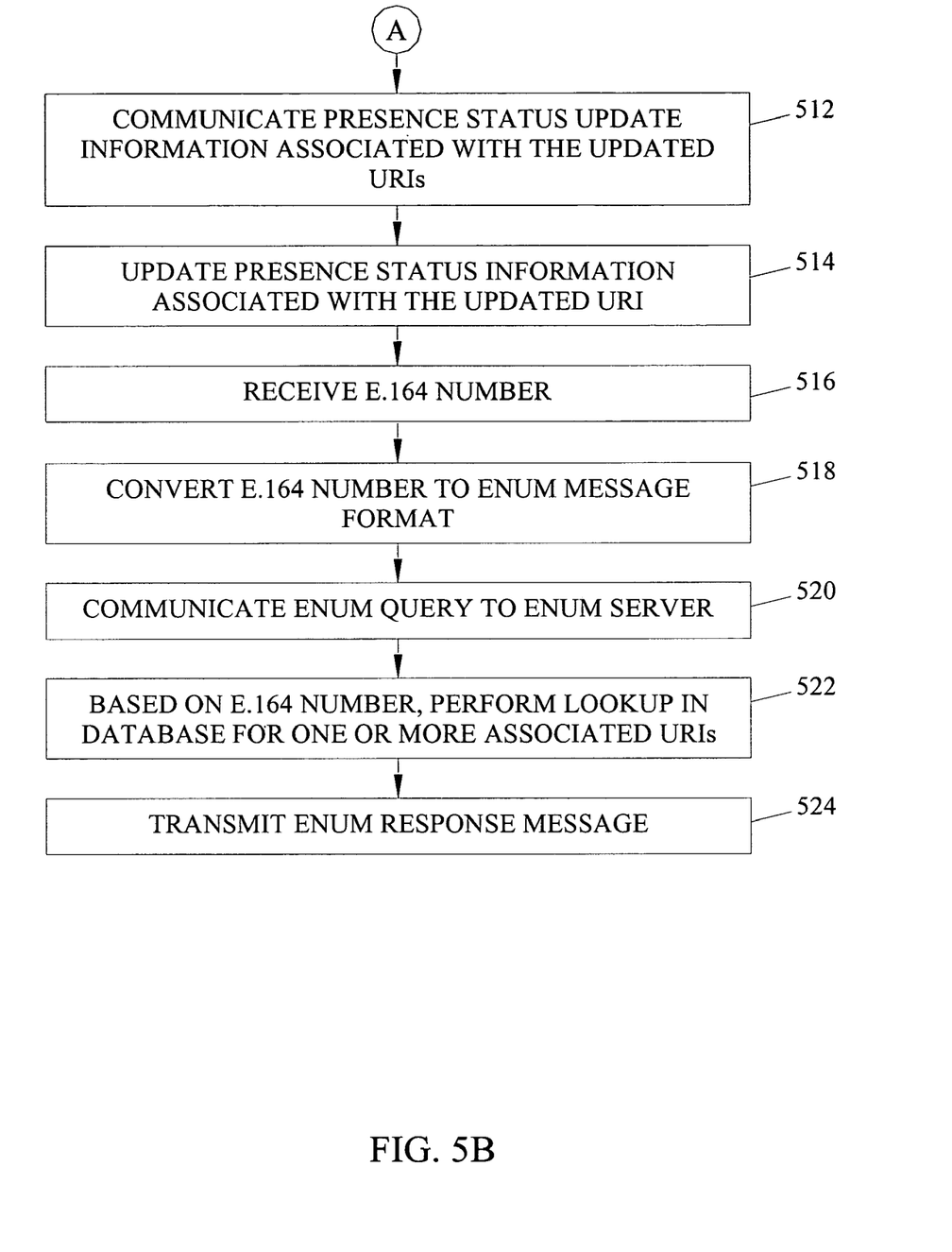

FIGS. 5A and 5B illustrate a flow chart of exemplary steps by which presence server 404 can provide presence subscription service to ENUM server 402 according to an embodiment of the subject matter described herein. Referring to FIG. 5A, in step 500, an ENUM application of ENUM server 402 can generate and communicate a presence request message to presence server 204 to identify one or more of the URIs for which presence status information updates are requested. At step 502, presence server 404 can perform a look up in database 410 for retrieving presence status information of each of the URIs identified within the presence subscription request. The presence status information can be availability and/or unavailability information for one or more of the URIs associated with presence query message. The retrieved presence status information can be utilized for communicating a response to ENUM server 202 to indicate the availability and/or unavailability of the URIs (step 504).

The ENUM application of ENUM server 402 can generate an ENUM response message containing availability and/or unavailability information for one or more URIs associated with the E.164 number in the original ENUM message. At step 506 of FIG. 5, ENUM server 402 can communicate the ENUM response message to gateway 414. Further, ENUM server 402 can store the presence status information communicated from presence server 404. The presence status information may be stored in ENUM database 412 and indexed according to its associated URI. The stored presence status information may then be available for subsequent requests for presence status information. In this way, ENUM server 402 will not have to query presence server 404 for a URI for which presence status information is stored.

Further, in response to receiving a presence subscription request, presence server 404 can provide presence status changes for the one or more URIs for which a subscription has been requested. At step 508, presence server 404 can monitor the availability and/or unavailability of the identified URIs. Next, at step 510, presence server 404 can determine whether an update has been made to one or more of the identified URI. If it is determined that an update has been made, presence server 404 can communicate to ENUM server 402 presence status update information associated with the updated URI (step 512 shown in FIG. 5B). Next, at step 514 of FIG. 5B, ENUM server 402 can update the presence status information for the URI. Returning to step 510, if there are no updates, presence server 204 can continue to monitor for updates at step 510.

In step 516 of FIG. 5B, gateway 414 can receive an E.164 number. Gateway 414 can then convert the E.164 number to an ENUM message format (step 518). Next, at step 520, gateway 206 can communicate an ENUM query containing the converted E.164 number to ENUM server 402.

At step 522 of FIG. 5B, the ENUM application can utilize the ENUM query for performing a look up in ENUM database 412 to retrieve one or more URIs associated with the received E.164 number. Next, ENUM server 402 can generate and transmit an ENUM response message indicating the available URIs associated with the E.164 number.

While ENUM server 402 is subscribed to availability update information from presence server 404 for a URI, presence server 404 can continually monitor for updates to the availability information for the URI under subscription. When there is an update to the availability information, presence server 404 can communicate the update to ENUM server 402. By the communication of updates of presence status information, it may only be necessary for ENUM server 402 and presence server 404 to communicate when presence status information for a URI requires updating and when ENUM server 402 does not have presence status information stored for a particular URI for which information is requested.

Figure 6:
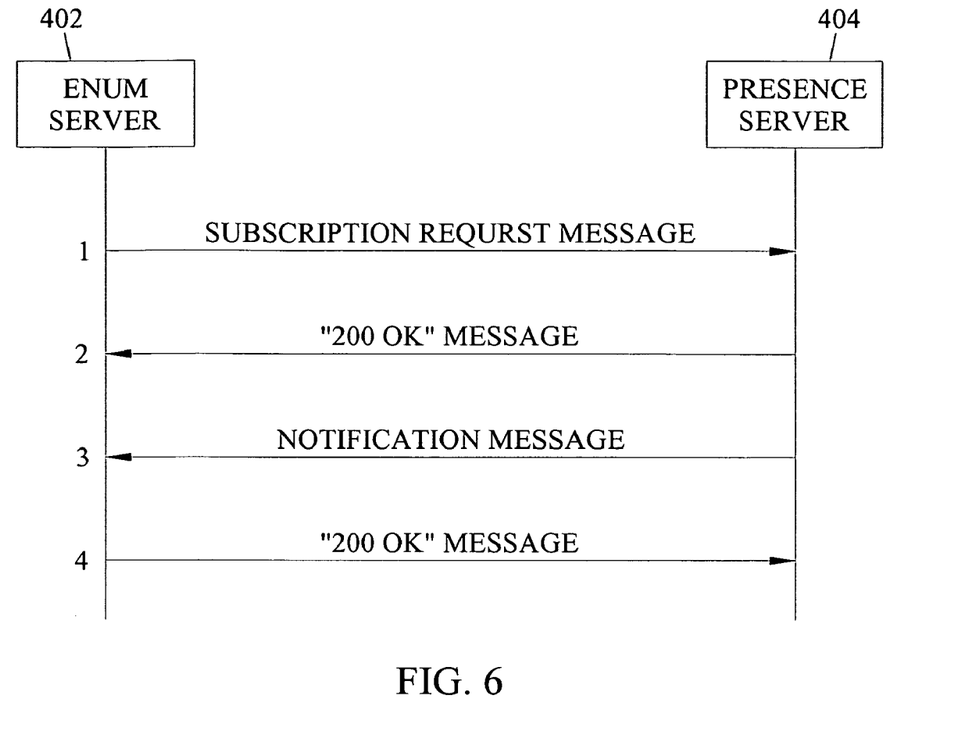
FIG. 6 is a message flow timing diagram of an ENUM server establishing a presence subscription service with a presence server according to one embodiment of the subject matter described herein.

In one exemplary implementation, SIP or SIP for Instant Messaging and Presence Leveraging Extensions (SIMPLE) protocol may be used for implementing presence subscription service between an ENUM server and a presence server. For example, ENUM server 402 and presence server 404 are operable to implement SIMPLE protocol for establishing a presence subscription service. FIG. 6 is a message flow diagram of an ENUM server 600 establishing a presence subscription service with a presence server 602 according to one embodiment of the subject matter described herein. Referring to FIG. 6, in line 1 of the message flow diagram, ENUM server 402 transmits to presence server 404 a subscription request message containing a URI for which presence subscription service is requested. Presence server 404 authenticates the subscription request message and, if the request is authenticated, in line 2 transmits a "200 OK" message acknowledging the request. In line 3, presence server 404 transmits a notification message containing the current availability information for the URIs contained in the subscription request. ENUM server 600 can store the availability information and associate it with the URI. In line 4, ENUM server 600 transmits a "200 OK" message, acknowledging receipt of notification message 608.

Figure 7:
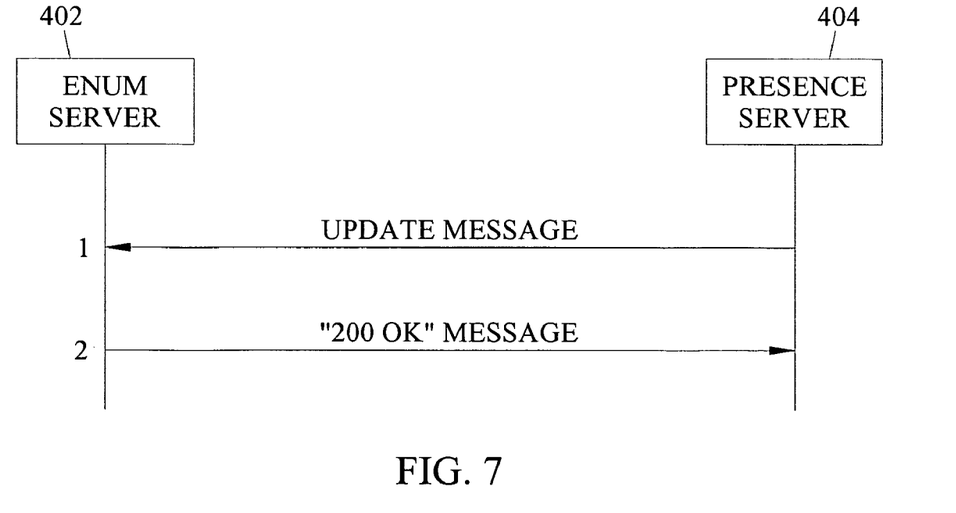
FIG. 7 is a message flow timing diagram of a presence server providing presence update information to an ENUM server according to one embodiment of the subject matter described herein.

FIG. 7 is a message flow diagram illustrating presence server 404 providing presence update information to ENUM server 402 according to one embodiment of the subject matter described herein. Referring to FIG. 7, in line 1 of the message flow diagram, presence server 402 generates and transmits a message containing update presence status information when a change is made to the status of the URI for which a subscription has been established. The presence status information can include availability and/or unavailability information for the URI. In response to receiving message, in line 2, ENUM server 402 transmits a "200 OK" message. ENUM server 402 can updated its stored availability information with the updated status information of message of line 1.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for providing presence-qualified ENUM service in a communications network, the method comprising:
   (a) receiving an ENUM query message including an E.164 number; and
   (b) in response to receiving the ENUM query message:
      (i) locating at least one uniform resource identifier (URI) associated with the E.164 number;
      (ii) querying a presence server for presence status information for the at least one URI; and
      (iii) sending a response to the ENUM query message with the at least one URI and a corresponding presence status.

2. The method according to claim 1 wherein the E.164 number comprises a called party number.

3. The method according to claim 1 wherein the E.164 number is associated with a subscriber.

4. The method according to claim 1 wherein the at least one URI includes at least one of a SIP URI, an instant messaging (IM) identifier, an e-mail address identifier, an Internet chat session identifier, and an P address.

5. The method according to claim 1 wherein locating at least one URI comprises searching a database of naming authority pointer (NAPTR) records containing URIs associated with the E.164 number.

6. The method according to claim 1 wherein sending a response to the ENUM query message comprises determining the presence status based on the presence status information stored by the presence server.

7. The method according to claim 1 wherein sending a response to the ENUM query message comprises responding to the ENUM query message with only the URIs that have an available presence status.

8. The method according to claim 1 wherein sending a response to the ENUM query message comprises responding to the ENUM query message with all of the URIs located based on the E.164 number and indicating a presence status of each URI.

9. The method according to claim 1 wherein the ENUM query message includes a calling party number, and wherein the method further comprises applying at least one of a blacklist and a whitelist screening algorithm using the calling party number for determining the available presence status of each URI.

10. The method of claim 1 wherein steps (a) and (b) are performed by an ENUM server in response to receiving the ENUM query message.

11. A method for providing presence-qualified ENUM service in a communications network, the method comprising:
  (a) communicating a presence subscription request associated with at least one uniform resource identifier (URI) to a presence server;
  (b) receiving presence status information associated with the at least one URI from the presence server;
  (c) storing the presence status information; and
  (d) receiving an ENUM query message including an E.164 number corresponding to the at least one URI, and, in response, using the stored status information to respond to the ENUM query message with the at least one URI number and a presence status for the at least one URI.

12. The method according to claim 11 wherein the presence status information includes availability and unavailability presence status for the at least one URI.

13. The method according to claim 11 wherein the at least one URI includes at least one of a SIP URI, an instant messaging (IM) identifier, an e-mail address identifier, an Internet chat session identifier, and an P address.

14. The method according to claim 11 wherein the E.164 number comprises a called party number.

15. The method according to claim 11 wherein the E.164 number is associated with a subscriber.

16. The method according to claim 11 wherein step (d) comprises responding to the ENUM query message with only the URIs that have an available presence status.

17. The method according to claim 11 wherein step (d) comprises responding to the ENUM query message with all of the URIs located using the E.164 number and indicating the presence status of the URIs.

18. The method of claim 11 wherein steps (a)-(d) are performed by an ENUM server.

19. A system for providing presence-qualified ENUM service in a communications network, the system comprising:
  (a) a presence server including presence status information for at least one uniform resource identifier (URI); and
  (b) an ENUM application for receiving an ENUM query message including an E.164 number, and, in response to the ENUM query message:
    (i) locating at least one URI associated with the E.164 number;
    (ii) querying the presence server for presence status information for each URI associated with the E.164 number; and
    (iii) sending a response to the ENUM query message with URIs that have an available presence status.

20. The system according to claim 19 wherein the E.164 number comprises a called party number.

21. The system according to claim 19 wherein the E.164 number is associated with a subscriber.

22. The system according to claim 19 wherein the at least one URI includes at least one of a SIP URI, an instant messaging (IM) identifier, an e-mail address identifier, an Internet chat session identifier, and an P address.

23. The system according to claim 19 wherein the ENUM application is operable to search a database of naming authority pointer (NAPTR) records containing URIs associated with the E.164 number.

24. The system according to claim 19 wherein the ENUM application is operable to determine the available presence status based on the presence status information received from the presence server.

25. The system according to claim 19 wherein the ENUM application is operable to respond to the ENUM query message with only the URIs that have an available presence status.

26. The system according to claim 19 wherein the ENUM application is operable to respond to the ENUM query message with all of the URIs located based on the called party telephone number and indicating a presence status of each URI.

27. The system according to claim 19 wherein the ENUM query message includes a calling party number, and wherein the ENUM application is operable to apply a blacklist or whitelist screening algorithm using the calling party number for determining the available presence status of each URI.

28. The system of claim 19 wherein the ENUM application resides on an ENUM server.

29. A system for providing presence-qualified ENUM service in a communications network, the system comprising:
  (a) a presence server including presence status information for at least one uniform resource identifier (URI); and
  (b) an ENUM application for:
    (i) communicating a presence subscription request associated with a uniform resource identifier (URI) to the presence server;
    (ii) receiving presence status information updates associated with the at least one URI from the presence server;
    (iii) storing the presence status information; and
    (iv) receiving an ENUM query message including an E.164 number corresponding to the at least one URI and using the stored status information to respond to the ENUM query with the at least one URI and the corresponding presence status information.

30. The system according to claim 29 wherein the presence status information updates includes availability and unavailability presence status for the at least one URI.

31. The system according to claim 29 wherein the at least one URI includes at least one of a SIP URI, an instant messaging (IM) identifier, an e-mail address identifier, an Internet chat session identifier, and an P address.

32. The system according to claim 29 wherein the E.164 number comprises called party number.

33. The system according to claim 29 wherein the E.164 number is associated with a subscriber.

34. The system according to claim 29 wherein the ENUM application is operable to respond to the query message with only the URIs that have an available presence status.

35. The system according to claim 28 wherein the ENUM application is operable to respond to the query message with all of the URIs located using the E.164 number and indicating the presence status of the URIs.

36. The system of claim 29 wherein the ENUM application resides on an ENUM server.

37. A computer program product comprising computer executable instructions embodied in a tangible computer readable medium for performing steps comprising:
  (a) receiving an ENUM query message including an E.164 number; and
  (b) in response to receiving the ENUM query message:
    (i) locating at least one uniform resource identifier (URI) associated with the E.164 number;
    (ii) querying a presence server for presence status information for the at least one URI; and
    (iii) sending a response to the ENUM query message with the at least one URI and a corresponding presence status.

38. The computer program product according to claim 37 wherein the E.164 number comprises a called party number.

39. The computer program product according to claim 37 wherein the E.164 number is associated with a subscriber.

40. The computer program product according to claim 37 wherein the at least one URI includes at least one of a SIP URI, an instant messaging (IM) identifier, an e-mail address identifier, an Internet chat session identifier, and an IP address.

41. The computer program product according to claim 37 wherein locating at least one URI comprises searching a database of naming authority pointer (NAPTR) records containing URIs associated with the E.164 number.

42. The computer program product according to claim 37 wherein sending a response to the ENUM query message comprises determining the presence status based on the presence status information stored by the presence server.

43. The computer program product according to claim 37 wherein sending a response to the ENUM query message comprises responding to the ENUM query message with only the URIs that have an available presence status.

44. The computer program product according to claim 37 wherein sending a response to the ENUM query message comprises responding to the ENUM query message with all of the URIs located based on the E.164 number and indicating a presence status of each URI.

45. The computer program product according to claim 37 wherein the ENUM query message includes a calling party number, and wherein the method further comprises applying at least one of a blacklist and a whitelist screening algorithm using the calling party number for determining the available presence status of each URI.

46. The computer program product of claim 37 wherein steps (a) and (b) are performed by an ENUM server in response to receiving the ENUM query message.

47. A computer program product comprising computer executable instructions embodied in a tangible computer readable medium for performing steps comprising:
  (a) communicating a presence subscription request associated with at least one uniform resource identifier (URI) to a presence server;
  (b) receiving, presence status information associated with the at least one URI from the presence server;
  (c) storing the presence status information; and
  (d) receiving an ENUM query message including an E.164 number corresponding to the at least one URI, and, in response, using the stored status information to respond to the ENUM query message with the at least one URI number and a presence status for the at least one URI.

48. The computer program product according to claim 47 wherein the presence status information includes availability and unavailability presence status for the at least one URI.

49. The computer program product according to claim 47 wherein the at least one URI includes at least one of a SIP URI, an instant messaging (IM) identifier, an e-mail address identifier, an Internet chat session identifier, and an IP address.

50. The computer program product according to claim 47 wherein the E.164 number comprises a called party number.

51. The computer program product according to claim 47 wherein the E.164 number is associated with a subscriber.

52. The computer program product according to claim 47 wherein step (d) comprises responding to the ENUM query message with only the URIs that have an available presence status.

53. The computer program product according to claim 47 wherein step (d) comprises responding to the ENUM query message with all of the URIs located using the E.164 number and indicating the presence status of the URIs.

54. The computer program product of claim 47 wherein steps (a)-(d) are performed by an ENUM server.

* * * * *